May 10, 1932.  A. P. ARMINGTON ET AL  1,857,343
LAND VEHICLE
Filed Aug. 10, 1929  4 Sheets-Sheet 1
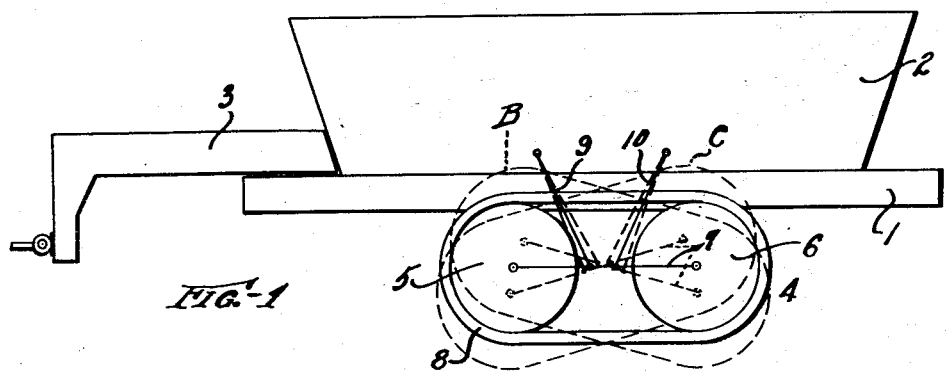
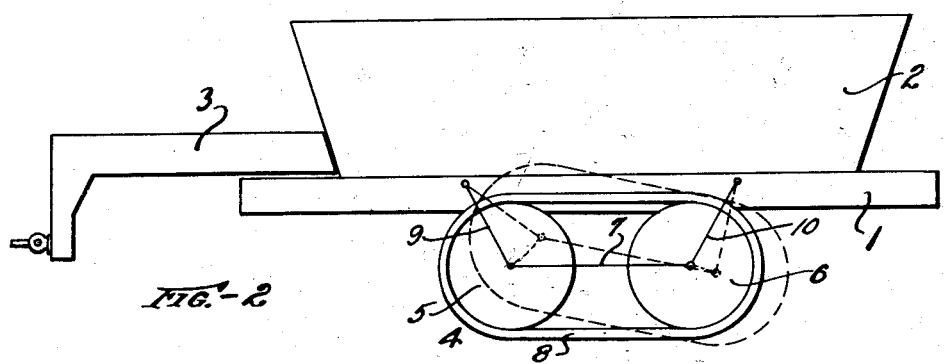
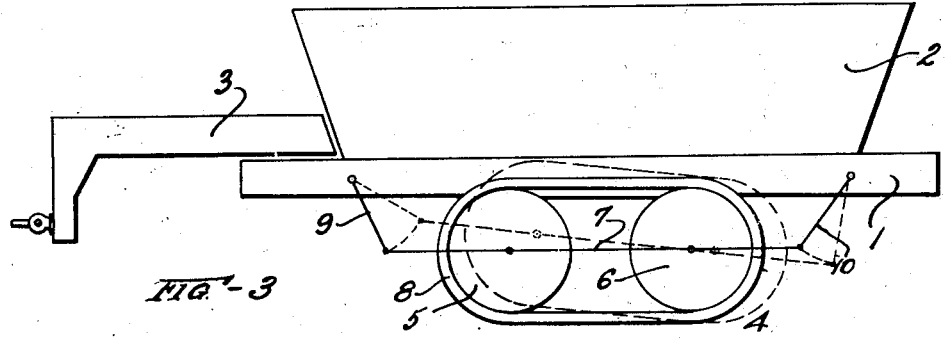
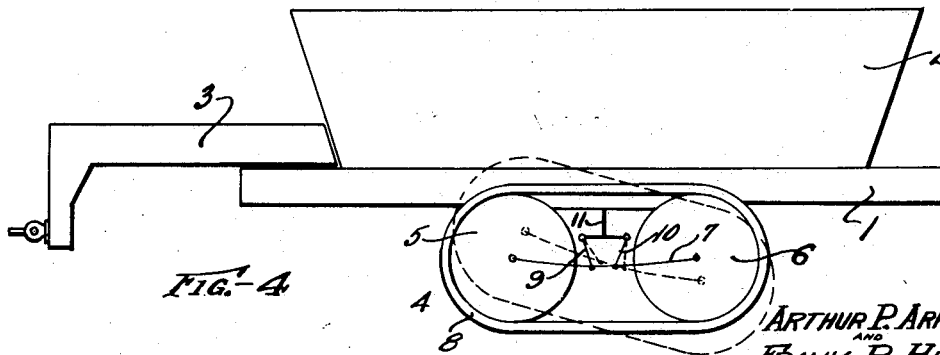
INVENTORS
ARTHUR P. ARMINGTON
AND
FRANK R. HIGLEY
BY
Brickett, Hyde, Higley & Meyer
ATTORNEYS

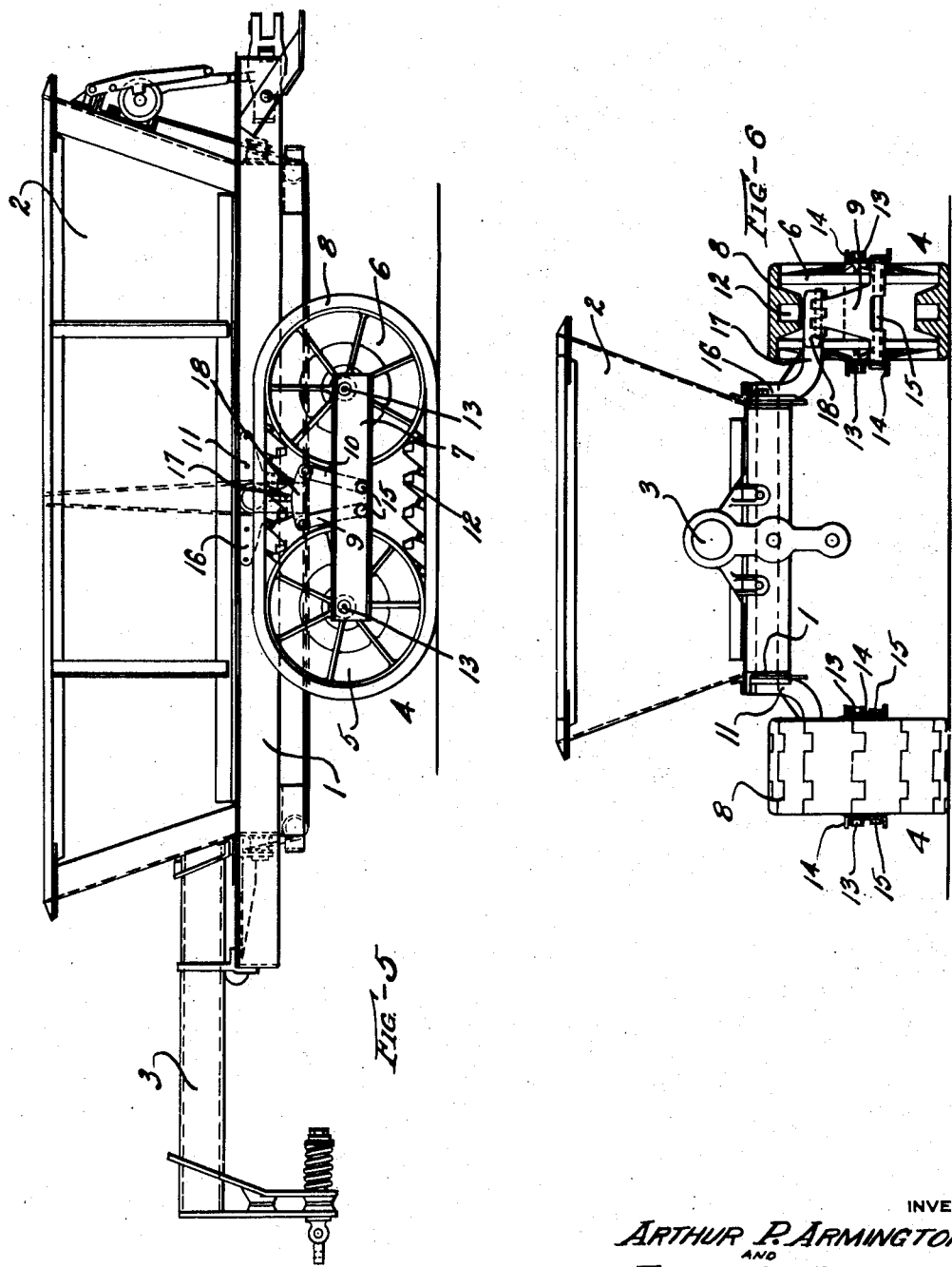

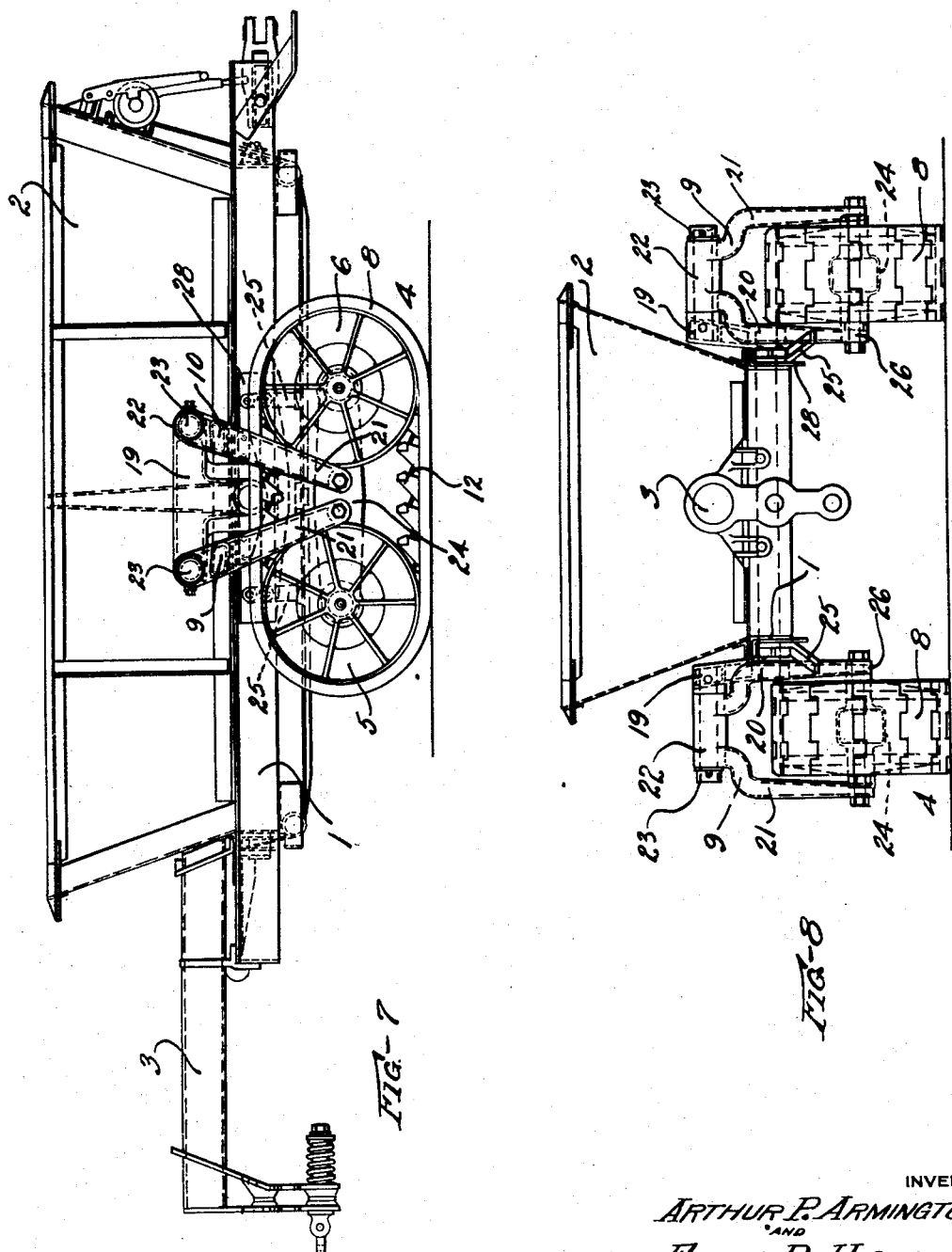

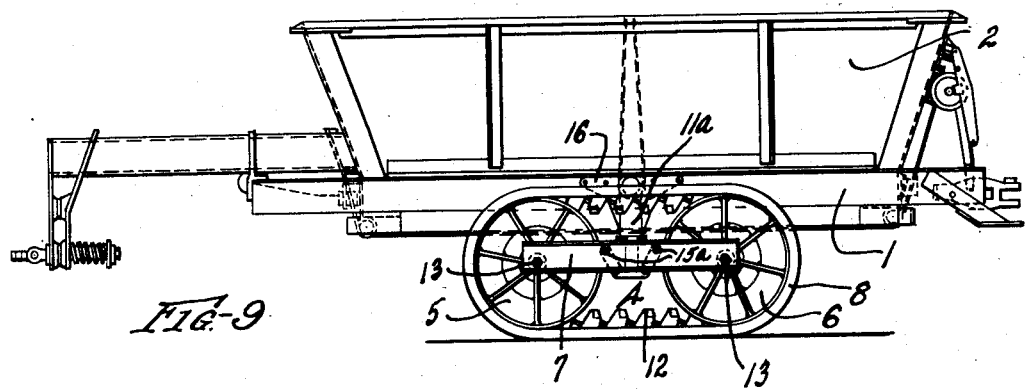
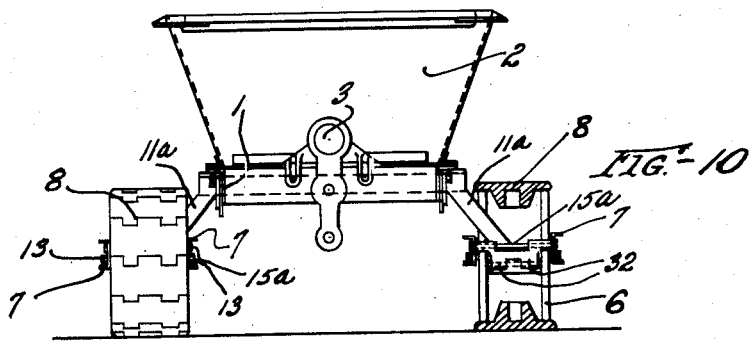
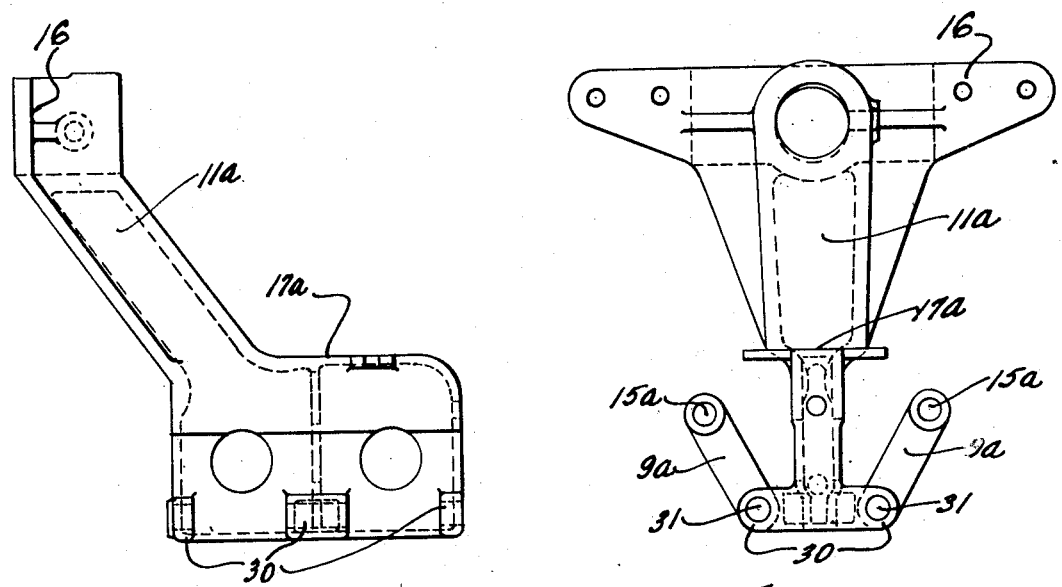

Patented May 10, 1932

1,857,343

UNITED STATES PATENT OFFICE

ARTHUR P. ARMINGTON, OF WILLOUGHBY, AND FRANK R. HIGLEY, OF CLEVELAND HEIGHTS, OHIO, ASSIGNORS TO THE EUCLID CRANE & HOIST COMPANY, OF EUCLID, OHIO, A CORPORATION OF OHIO

LAND VEHICLE

Application filed August 10, 1929. Serial No. 385,010.

This invention relates to land vehicles and more particularly to running gear means therefore generally of endless tread linkage type known variously as crawler or creeper wheels.

An assembly for such a linkage has as its object an increase in the bearing or base area and traction characteristic, over the possibilities in operating features where wheels alone are used.

An assembly of the character to which reference is had comprises as its essential elements a pair of wheels arranged in a plane and having associated means for maintaining the wheels in spaced relation, and an endless tread linkage arranged about the wheels with a bight on either wheel and stretches therebetween, the tread linkage being of so-called truss type whereby the stretches are maintained against inward flexure between the wheels. Such an assembly is classed as a wheel substitute from the possibility that the means which maintain the wheels in spaced relation and thus serves as a strut, may have supporting connection with the body of a vehicle as does a wheel. Our invention pertains particularly to such supporting connection and has for its broad object an arrangement whereby the required tractive effort is decreased, and more specifically comprises means whereby the assembly may lag relative to said body as an obstruction is met and the forward portion of the assembly will be elevated dependent upon said lag.

To this end we employ link means connecting the vehicle body with the creeper wheel assembly as will appear.

The exact nature of our invention together with further objects and advantages thereof will be apparent from the following description taken in connection with the accompanying drawings in which Figs. 1-4 inclusive are diagrammatic side elevations of a cart type of dump trailer illustrative of various forms of our invention; Figs. 5 and 6 are side and front end elevations respectively of structure following the form of our invention indicated in Fig. 4; Figs. 7 and 8 are views corresponding with Figs. 5 and 6 but showing structural application of the form of our invention indicated in Fig. 1; Figs. 9 and 10 are views also corresponding with Figs. 5 and 6 but showing an underslung body-supporting arrangement; and Figs. 11 and 12 are detail views of parts appearing in Figs. 9 and 10.

With reference now to the drawings, wherein similar or corresponding parts bear similar reference characters, a heavy-duty dump trailer is indicated, having a body including the usual frame 1 and load-receiving hopper 2; means for applying draft to the body, such as a drawbar 3 shown as of arched form having a downwardly extending hitch member for connection with the tractor drawbar; and running gear for supporting the body in elevated position. The running gear on either side of the vehicle comprises a creeper assembly of endless tread type, and means for supporting the body thereon.

The creeper assembly generally designated by the reference character 4 comprises the usual paired wheels 5 and 6 maintained in spaced relation in a plane by a generally horizontal spacing member 7, and an endless tread linkage 8 arranged about the wheels 5 and 6, and preferably of so-called truss-forming type. What has thus far been specifically described, is old and may be considered as typical of the art; and as will be obvious to anyone familiar therewith it will be seen that with the creeper assembly resting upon the ground its lower stretch will form a tread, inflexible upwards if the linkage be of truss-forming type, the wheels rolling along the stretch, instead of upon the ground as would be the case were the tread omitted; the tread stretch being continuously laid by the forward wheel and picked up by the rearward wheel.

According to our invention we connect the wheel spacing member with the body in a novel manner to provide the described result. To this end we employ a pair of links 9 and 10 arranged in upwardly diverging relation each connected at its lower end with the spacing member, and at its upper end with the body. The lower ends of the links are spaced in the direction of wheel spacing. The conrections for the links are loose, that is, the links are not fixed, so that a four-bar linkage is had including the links just described, the wheel spacing member, and that portion of the body between the upper extremities of these links.

It will be apparent that when an obstruction is met by the creeper assembly, during motion of the vehicle produced by draft upon the drawbar, the creeper assembly, by virtue of the four-bar linkage arrangement, may lag relative to the body both links 9, 10 moving in a counter-clockwise direction Figs. 1–4. It will be also apparent that owing to the angular arrangement of the links 9 and 10 the lower extremity of the forward link 9 moves rearwardly with an upward component of motion and the lower extremity of the rearward link 10 has a downward component of motion. Therefore, as the creeper assembly lags it likewise is caused by the links 9 and 10 to tilt in clockwise direction, elevating its forward end and lowering its rearward end; all as indicated by the broken lines, position B. In a sense the result is that the body is jacked up upon the rearward link 10, this link moving towards horizontal position, with its lower extremity stationary relative to the ground and its upper extremity moving forwardly with the body. Thus the creeper assembly, when it meets an obstruction will tilt upwardly and ride over the same without materially increased draft requirement. Similarly as indicated by the broken line position C, should a depression be met by the creeper assembly it will be caused to tilt forwardly and downwardly; it being understood that the vehicle body is maintained in horizontal position by means such as its drawbar, as will be well understood.

In the form illustrated in Fig. 1 the connection of the links with the wheel spacing member is between the wheel centers. Thus the tilting of the creeper assembly is great as compared with its lag. It will be noted that here the spacing member 7 acts as a strut as between the wheels 5 and 6, and as a beam with respect to the links 9 and 10.

In the form indicated Fig. 2 the lower extremities of the links 9 and 10 have connection with the spacing member 7 at the wheel centers. This gives a similar action to the creeper assembly and is a simpler arrangement.

In the form illustrated Fig. 3 the spacing member 7 extends beyond the wheel centers, and has connection with the links 9 and 10 at its ends; and the link of the spacing member is such that the upper extremities of the links may have connection with the body at the ends of the hopper 2 thereof. Thus the body need include no transverse members in the zone of the hopper mouth, so that the load may be dumped entirely clear of any obstruction.

In the form illustrated in Fig. 4, the spacing member 7 is such that the connections of the links 9 and 10 therewith are slightly lower than the wheel centers so that the creeper assembly has greater stability. Also the links 9 and 10 are shortened, having connection at their upper end with the body through the medium of a member 11 of inverted T form.

With reference now to Figs. 5 and 6 an actual embodiment of the structure indicated by Fig. 4 is shown. Here the creeper assembly, on each side of the vehicle comprises four wheels each spaced laterally from another and being arranged in the plane of another, with an endless tread linkage 8 being trained about the set of four wheels and having inwardly extending strut forming portions conventionally indicated as at 12. The wheel spacing members 7 are in the form of a pair of channel iron pieces 14 carrying the wheel axles 13 and arranged outside the wheels. The links 9 and 10 are arranged inside the wheels, between tread stretches and have connection with the channel members 14 as by pins 15 extending therebetween. The member 11 of Fig. 4 is in the form of a bracket having a portion 16 secured with the side of the frame 1 and a portion 17 extending between the tread stretches, there spread laterally as at 18 and having a hinge type of connection as indicated Fig. 6, with the links.

With reference now to Figs. 7 and 8, structure conventionally indicated by Fig. 1 is shown wherein a bracket 19 is secured on either side of the body for carrying the upper extremities of the links 9 and 10, and each link is in the form of a yoke with a pair of arms 20, 21 extending downwardly outside the creeper assembly and having a hub portion 22 between the arms 20, 21 mounted upon a pin 23 carried by the bracket 19. Here the wheel spacing members 7 of Fig. 1 is in the form of a rocker 24 arranged within the four wheels of the creeper assembly. Stops 25 carried by the body as integral with the member 28 are provided for limiting swing of the rocker 24 as by engagement with the projecting hub portions 26 of the creeper assembly.

With reference now to Figs. 9–12, the arrangement indicated particularly Figs. 9 and 10 may be compared with that of Figs. 5 and 6; the important difference thereover being that the body in Figs. 9 and 10 is underslung as against its overslung arrangement of Figs. 5 and 6.

To this end the bracket 11a is carried downwardly below the centers 13 of the wheels 6, and the links 9a extend from the lower end of the bracket upwardly to their connection with the creeper assembly at 15a; the links 9a diverging upwardly, however, as before. As indicated Fig. 10 the details of the connections between these parts are generally otherwise similar to that indicated Fig. 6; the arm portion 17a of the brackets 11a having lugs 30 outstanding fore-and-aft of the bracket arm 17a for carrying hinge pins 31, the links 9a having corresponding lugs 32 fitting between the lugs 30 to receive their hinge pins 31. At their upper extremities the links 9a have connection as by pin 15a with the side members 7 of their creeper assemblies.

By such underslung arrangement it will be apparent that the body of the vehicle is stable upon its creeper assemblies as against the instability of the showings of Figs. 5–8 inclusive; yet the creeper assemblies may move rearwardly of the body as before and will be raised at their forward ends dependent on said movement also as before. During such movement each wheel axle 13 will proceed generally in an arc, but these arcs will be reversed as to curvature with respect to those indicated Fig. 2 for example; that is, in the construction of Figs. 9 and 10 the arcs of movement of the axles 13 of one creeper assembly will be concave toward each other as distinguished from the arcs Fig. 2 which are convex toward each other. The result is that when a creeper assembly is passing over an obstruction, its tendency to jump forward as it passes from the obstruction will be substantially lessened.

While we have illustrated and described what is known as a cart type of vehicle, that is, characterized by two-wheel single-axle construction as distinguished from the wagon-type four-wheel double-axle construction it will be apparent that our invention is equally applicable to any type of vehicle provided means for maintaining the level of the vehicle body be present. Thus where our invention be applied to a wagon type of vehicle the creeper assemblies on one end thereof serve this purpose for the other end thereof.

Analysis of the foregoing will show that, in the operation of each form of the linkage, the creeper assembly is caused to tilt about a moving axis whose instantaneous location is always at the intersection of the prolongation of the nonparallel supporting links 9 and 10 in Figs. 1–8, 9a in Figs. 9 and 12. Thus, as will appear from Figs. 1–4, the location of the axis is below the wheel spacing member 7, and without any physical member. In fact, as in Figs. 2 and 3 the axis is below the ground level.

While endless treads 8 are illustrated as trained about the wheels 5 and 6, it will be obvious that the described four-bar linkages would function identically were the treads omitted and the vehicle run merely upon its wheels. Therefore, while the term creeper assembly is employed herein, we do not wish to thereby bind ourselves to the employment of the treads 8 in the structures illustrated and described.

What we claim is:

1. In a land vehicle, a body, and running gear therefor including an endless tread creeper assembly and means supporting said body thereon, said creeper assembly including a pair of wheels and a member serving to maintain said wheels in spaced relation and said supporting means including a pair of non-parallel links each connected at one end with said body, and at the opposite end with said spacing member at a point between said wheels.

2. In a land vehicle, a body, and running gear therefor including an endless tread creeper assembly and means supporting said body thereon, said creeper assembly including a pair of spaced wheels, with spacing means for maintaining the relation of said wheels and an endless tread trained about said wheels, and said supporting means including a pair of links each connected at one end with said body and at the opposite end with said spacing means between said wheels and the tread stretches.

3. In a land vehicle, a body, and running gear therefor including an endless tread creeper assembly and means supporting said body thereon, said creeper assembly including a pair of spaced wheels, with spacing means for maintaining the relation of said wheels and an endless tread trained about said wheels, and said supporting means including a bracket on said body and a pair of links connecting said bracket with said spacing member, said arm bracket extending between the stretches of said tread, and said links being arranged between said stretches.

4. A running gear assembly for a land vehicle comprising a plurality of wheels disposed at a side of the vehicle, links articulated for relative movement about axes parallel with those of said wheels, said linkage be-associated with said wheels to maintain the spacing thereof and with the vehicle body to support the same upon said wheels, and including a forward supporting link leaning forwardly and a supporting link wholly rearwardly thereof, the arrangement of the parts being such that said wheels may lag relative to the body, and said lag will cause elevation of a leading wheel.

5. A running gear assembly for a land vehicle comprising a plurality of wheels disposed at a side of the vehicle, links articulated for relative movement about axes parallel with those of said wheels, said linkage being associated with said wheels to maintain the spacing thereof and with the vehicle body to support the same upon said wheels, and including a forward supporting link leaning forwardly and associated with a leading wheel and a rearward supporting link leaning rearwardly and associated with a following wheel, whereby said wheels may lag relative to said body and said lag will be accompanied by a raising of the leading wheel and a lowering of a following wheel.

6. A running gear assembly for a land vehicle comprising a pair of wheels disposed at a side of the vehicle, links articulated for relative movement about axes parallel with those of said wheels, said linkage being associated with said wheels to maintain the spacing thereof and with the vehicle body to support the same upon said wheels, and including a forward supporting link leaning forwardly and associated with a leading wheel and a rearward supporting link leaning rearwardly and associated with a following wheel, and a longitudinally extending link connecting said wheels, said leaning links comprising end members of an open four-bar linkage of which said longitudinal link is a member, whereby said wheels may lag relative to said body and said lag will be accompanied by a rearward tilting of said longitudinal link to raise the leading wheel and lower the following wheel.

7. In a land vehicle, a body and running gear therefor including endless tread creeper assembly and means supporting said body thereon, said supporting means comprising a bracket rigidly associated with said body and a pair of links arranged in downwardly converging relation, with their lower ends associated with said bracket and their upper ends associated with said creeper assembly.

In testimony whereof we hereby affix our signatures.

ARTHUR P. ARMINGTON.
FRANK R. HIGLEY.